(12) United States Patent
Greasley

(10) Patent No.: US 12,033,381 B2
(45) Date of Patent: Jul. 9, 2024

(54) SCENE-TO-TEXT CONVERSION

(71) Applicant: Apple Inc., Cupertino, CA (US)

(72) Inventor: Jack Greasley, Mill Valley, CA (US)

(73) Assignee: APPLE INC., Cupertino, CA (US)

( * ) Notice: Subject to any disclaimer, the term of this patent is extended or adjusted under 35 U.S.C. 154(b) by 224 days.

(21) Appl. No.: 17/466,379

(22) Filed: Sep. 3, 2021

(65) Prior Publication Data

US 2021/0397842 A1 Dec. 23, 2021

Related U.S. Application Data

(63) Continuation of application No. PCT/US2020/050886, filed on Sep. 15, 2020.

(60) Provisional application No. 62/906,790, filed on Sep. 27, 2019.

(51) Int. Cl.
*G06V 20/20* (2022.01)
*G06F 3/16* (2006.01)
*G06T 7/11* (2017.01)
*G06T 7/50* (2017.01)
*G06V 30/262* (2022.01)
*G10L 13/033* (2013.01)

(52) U.S. Cl.
CPC ............. *G06V 20/20* (2022.01); *G06F 3/167* (2013.01); *G06T 7/11* (2017.01); *G06T 7/50* (2017.01); *G06V 30/274* (2022.01); *G10L 13/033* (2013.01)

(58) Field of Classification Search
CPC ...... G06V 20/20; G06V 30/274; G06F 3/167; G06F 3/011; G06T 7/11; G06T 7/50; G10L 13/033
See application file for complete search history.

(56) References Cited

U.S. PATENT DOCUMENTS

| 9,792,501 | B1 | 10/2017 | Maheriya et al. | |
| 11,455,796 | B1* | 9/2022 | Pomes | G06V 40/19 |
| 11,551,688 | B1* | 1/2023 | Pomes | G10L 15/16 |
| 11,568,857 | B2* | 1/2023 | Higurashi | G06N 3/084 |

(Continued)

FOREIGN PATENT DOCUMENTS

JP 2006030464 A 2/2006

OTHER PUBLICATIONS

PCT International Search Report and Written Opinion dated Dec. 9, 2020, International Application No. PCT/US2020/050886, pp. 1-13.

(Continued)

*Primary Examiner* — Aaron W Carter
(74) *Attorney, Agent, or Firm* — Fernando & Partners, LLP

(57) ABSTRACT

Various implementations disclosed herein include devices, systems, and methods for performing scene-to-text conversion. In various implementations, a device includes a non-transitory memory and one or more processors coupled with the non-transitory memory. In some implementations, a method includes obtaining environmental data corresponding to an environment. Based on the environmental data, a plurality of objects that are in the environment are identified. An audio output describing at least a first object of the plurality of objects in the environment is generated based on a characteristic value associated with a user of the device. The audio output is outputted.

25 Claims, 8 Drawing Sheets

(56) References Cited

U.S. PATENT DOCUMENTS

| | | | | |
|---|---|---|---|---|
| 2003/0026461 | A1* | 2/2003 | Arthur Hunter | A61F 9/08 382/114 |
| 2006/0229939 | A1* | 10/2006 | Bhakta | G06Q 99/00 705/14.62 |
| 2007/0211947 | A1* | 9/2007 | Tkacik | G09B 21/006 382/114 |
| 2008/0249872 | A1* | 10/2008 | Russell | G06Q 30/02 705/14.66 |
| 2010/0113073 | A1* | 5/2010 | Schlesener | H04M 1/72436 455/466 |
| 2013/0063578 | A1* | 3/2013 | Uesaka | H04N 13/341 348/53 |
| 2014/0072155 | A1* | 3/2014 | Norris | H04R 3/00 381/316 |
| 2016/0005334 | A1* | 1/2016 | Guo | G09B 21/006 348/62 |
| 2016/0073138 | A1* | 3/2016 | Francisco | H04N 21/2393 725/28 |
| 2016/0314708 | A1* | 10/2016 | Cohain | G08B 6/00 |
| 2018/0189567 | A1* | 7/2018 | Maheriya | G09B 21/007 |
| 2018/0239428 | A1* | 8/2018 | Maheriya | G06F 3/0346 |
| 2019/0070064 | A1* | 3/2019 | Hogle | G06V 10/44 |
| 2020/0106955 | A1* | 4/2020 | Fleizach | H04N 23/64 |
| 2020/0175053 | A1* | 6/2020 | Zheng | G06N 5/046 |
| 2021/0397842 | A1* | 12/2021 | Greasley | G06V 20/20 |
| 2021/0400342 | A1* | 12/2021 | Greasley | G06V 40/176 |
| 2022/0256156 | A1* | 8/2022 | Candelore | H04N 21/4394 |

OTHER PUBLICATIONS

Juan Diago Gomez et al., "Toward 3D scene understanding via audio-description: Kinect-iPad fusion for the visually impaired," Proceedings of the 13th international ACM SIGACCESS conference on Computers and accessibility, 2011, pp. 293-294.

Mohsen Zand et al., "Ontology-Based Semantic Image Segmentation Using Mixture Models and Multiple CRFs," IEEE Transactions on Image Processing, vol. 25, No. 7, Jul. 2016, pp. 3233-3248.

* cited by examiner

SCENE-TO-TEXT CONVERSION

CROSS-REFERENCE TO RELATED APPLICATION

This application is a continuation of Intl. Patent App. No. PCT/US2020/50886, filed on Sep. 15, 2020, which claims priority to U.S. Provisional Patent App. No. 62/906,790, filed on Sep. 27, 2019, which are both hereby incorporated by reference in their entirety.

TECHNICAL FIELD

The present disclosure generally relates to scene-to-text conversion.

BACKGROUND

Some devices are capable of generating and presenting graphical environments that include representations of physical elements. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
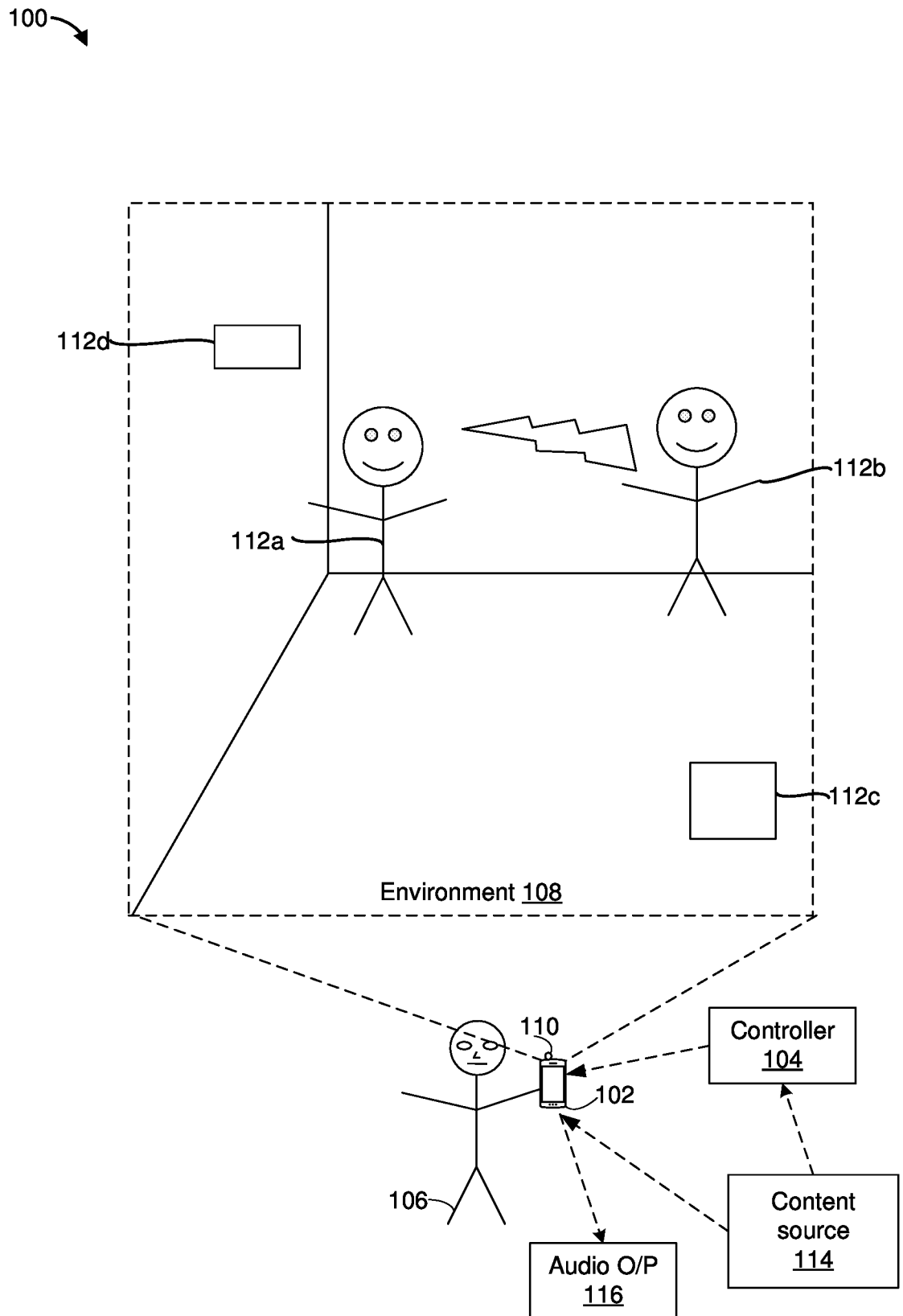
FIG. 1 depicts an exemplary system for use in various computer extended reality technologies, including virtual reality and mixed reality.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for performing scene-to-text conversion. In various implementations, a device includes a non-transitory memory and one or more processors coupled with the non-transitory memory. In some implementations, a method includes obtaining environmental data corresponding to an environment. Based on the environmental data, a plurality of objects that are in the environment are identified. An audio output describing at least a first object of the plurality of objects in the environment is generated based on a characteristic value associated with a user of the device. The audio output is outputted.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some visually impaired users are not able to view environments (e.g., physical environments or computer-generated three-dimensional (3D) environments). Accordingly, a need exists for an accessibility mode that facilitates the experience of environments by visually impaired users.

The present disclosure provides methods, systems, and/or devices for performing scene-to-text conversion. In various implementations, a device includes a non-transitory memory and one or more processors coupled with the non-transitory memory. In some implementations, a method includes obtaining environmental data corresponding to an environment. Based on the environmental data, a plurality of objects that are in the environment are identified. An audio output describing at least a first object of the plurality of objects in the environment is generated based on a characteristic value associated with a user of the device. The audio output is outputted.

In various implementations, a device identifies objects in an environment and creates a narrative description for the environment. In some implementations, the device generates and presents an audio description that describes relevant portions, such as objects, in the environment. Semantic segmentation may be used to identify objects in the environment and to create the narrative description. In some implementations, characteristics of the narrative description can be configured based on, for example, characteristic values associated with a user, desired characteristics of the narrative description, and/or a velocity and/or position of the user.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

FIG. 1 illustrates an exemplary operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes an electronic device 102 and a controller 104. In some implementations, the electronic device 102 is or includes a smartphone, a tablet, a laptop computer, and/or a desktop computer. The electronic device 102 may be worn by or carried by a user 106.

As illustrated in FIG. 1, the electronic device 102 and/or the controller 104 may obtain environmental data corresponding to an environment 108. In some implementations, the environment 108 is a physical environment. The electronic device 102 and/or the controller 104 may obtain environmental data from an environmental sensor 110. In some implementations, the environmental data includes an image or a video of the physical environment, and the environmental sensor 110 may be implemented as an image sensor, e.g., a camera. In some implementations, the environmental data includes depth data, and the environmental sensor 110 may be implemented as a depth sensor.

In some implementations, the environment 108 is an extended reality (XR) environment. In some implementations, the XR environment is generated by the electronic device 102 and/or the controller 104. In some implementations, the environment 108 includes a virtual environment that is a simulated replacement of a physical environment. For example, the XR environment may be simulated by the electronic device 102 and/or the controller 104. In such implementations, the XR environment is different from the physical environment in which the electronic device 102 is located.

In some implementations, the XR environment includes an augmented environment that is a modified version of a physical environment. For example, in some implementations, the electronic device 102 and/or the controller 104 modify (e.g., augment) the physical environment in which the electronic device 102 is located in order to generate the XR environment. In some implementations, the electronic device 102 and/or the controller 104 generate the XR environment by simulating a replica of the physical environment in which the electronic device 102 is located. In some implementations, the electronic device 102 and/or the controller 104 generate the XR environment by removing and/or adding items from the simulated replica of the physical environment where the electronic device 102 is located.

In some implementations, the environment 108 is a computer-generated three-dimensional (3D) environment. In some implementations, the environment 108 is referred to as a graphical environment or a computer graphics environment.

In some implementations, the environment 108 includes various objects 112, such as a character object 112a, a character object 112b, a robot object 112c, and a drone object 112d (collectively referred to as objects 112). In some implementations, the objects 112 are physical objects in a physical environment. In some implementations, the objects 112 are XR objects in an XR environment. In some implementations, the objects 112 are virtual objects (e.g., AR objects). In some implementations, the objects 112 are referred to as graphical objects.

In some implementations in which the environment is an XR environment, the objects 112 are XR representations of objective-effectuators. In some implementations, the objective-effectuators model characters from fictional materials such as movies, video games, comics, and novels. For example, the character object 112a may represent and model the behavior of a character from a fictional comic, and the character object 112b represents and models the behavior of a character from a fictional video game. In some implementations, the XR environment includes XR representations of objective-effectuators that represent and model the behavior of characters from different fictional materials (e.g., from different movies/games/comics/novels). In various implementations, the objective-effectuators represent and model the behavior of physical elements (e.g., tangible objects). For example, in some implementations, the objective-effectuators model the behavior of equipment (e.g., machinery such as planes, tanks, robots, cars, etc.). In the example of FIG. 1, the robot object 112c represents and models the behavior of a robot, and the drone object 112d represents and models the behavior of a drone. In some implementations, the objective-effectuators represent and model the behavior of entities (e.g., equipment) from fictional material. In some implementations, the objective-effectuators represent and model the behavior of physical elements from the physical environment, including entities located inside and/or outside of the environment 108. In some implementations, an objective-effectuator is referred to as a virtual intelligent agent, an intelligent agent or an agent.

In various implementations, a device directs an XR representation of an objective-effectuator to perform one or more actions in order to effectuate (e.g., advance, satisfy, complete and/or achieve) one or more objectives (e.g., results and/or goals). In some implementations, the objective-effectuator is associated with a particular objective, and the XR representation of the objective-effectuator performs actions that improve the likelihood of effectuating that particular objective. In some implementations, the XR representation of the objective-effectuator corresponds to an XR affordance. In some implementations, the XR representation of the objective-effectuator is referred to as an XR object, a graphical object or a virtual object.

In some implementations, an XR representation of the objective-effectuator performs a sequence of actions. In some implementations, a device determines (e.g., generates and/or synthesizes) the actions for the objective-effectuator. In some implementations, the actions generated for the objective-effectuator are within a degree of similarity to actions that a corresponding entity (e.g., a character, an equipment and/or a thing) performs as described in fictional material or as exists in a physical environment. For example, in some implementations, an XR representation of an objective-effectuator that corresponds to a fictional action figure performs the action of flying in an XR environment because the corresponding fictional action figure flies as described in the fictional material. Similarly, in some implementations, an XR representation of an objective-effectuator that corresponds to a physical drone performs the action of hovering in an XR environment because the corresponding physical drone hovers in a physical environment. In some implementations, the device obtains the actions for the objective-effectuator. For example, in some implementations, the device receives the actions for the objective-effectuator from a separate device (e.g., a remote server) that determines the actions.

In some implementations, an objective-effectuator corresponding to a character is referred to as a character objective-effectuator, an objective of the character objective-effectuator is referred to as a character objective, and an XR representation of the character objective-effectuator is referred to as an XR character. In some implementations, the XR character performs actions in order to effectuate the character objective. In some implementations, a character objective-effectuator is referred to as a virtual character.

In some implementations, an objective-effectuator corresponding to equipment (e.g., a rope for climbing, an airplane for flying, a pair of scissors for cutting) is referred to as an equipment objective-effectuator, an objective of the equipment objective-effectuator is referred to as an equipment objective, and an XR representation of the equipment objective-effectuator is referred to as an XR equipment. In some implementations, the XR equipment performs actions in order to effectuate the equipment objective.

In some implementations, an objective-effectuator corresponding to an environmental characteristic of an environment (e.g., weather pattern, features of nature and/or gravity level) is referred to as an environmental objective-effectuator, and an objective of the environmental objective-effectuator is referred to as an environmental objective. In some implementations, the environmental objective-effectuator configures an environment of the XR environment in order to effectuate the environmental objective.

In some implementations, the XR environment is generated based on a user input from the user 106. For example, in some implementations, the electronic device 102 and/or the controller 104 receive a user input indicating a terrain for the XR environment. In such implementations, the electronic device 102 and/or the controller 104 configure the XR environment such that the XR environment includes the terrain indicated via the user input. In some implementations, the user input indicates environmental conditions. In such implementations, the electronic device 102 and/or the controller 104 configure the XR environment to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow).

In some implementations, the actions for the objective-effectuators are determined (e.g., generated) based on a user input from the user 106. For example, in some implementations, the mobile device receives a user input indicating placement of the objective-effectuators. In such implementations, the electronic device 102 and/or the controller 104 position the objective-effectuators in accordance with the placement indicated by the user input. In some implementations, the user input indicates specific actions that the objective-effectuators are permitted to perform. In such implementations, the electronic device 102 and/or the controller 104 select the actions for the objective-effectuator from the specific actions indicated by the user input. In some implementations, the electronic device 102 and/or the controller 104 forgo actions that are not among the specific actions indicated by the user input.

In some implementations, the environment 108 is an XR environment, and the electronic device 102 and/or the controller 104 obtain environmental data corresponding to the XR environment. The environmental data may include an image or a video of the XR environment. The environmental data may be, may include, or may be included in metadata relating to the XR environment. In some implementations, the electronic device 102 and/or the controller 104 obtain the environmental data from an XR content source 114. In some implementations, the electronic device 102 and/or the controller 104 generate the XR environment, and the electronic device 102 and/or the controller 104 obtain (e.g., synthesize) the environmental data.

In some implementations, the electronic device 102 and/or the controller 104 identify a plurality of objects that are in the environment 108 based on the environmental data. For example, in some implementations, the electronic device 102 and/or the controller 104 perform semantic segmentation on the environmental data (e.g., the image, the video, the depth data, and/or the metadata) to identify objects in the environment 108. In the example of FIG. 1, the electronic device 102 and/or the controller 104 may identify the character object 112a, the character object 112b, the robot object 112c, and the drone object 112d based on the environmental data.

In some implementations, the electronic device 102 and/or the controller 104 generate an ontology based on the semantic segmentation. The ontology may be hierarchical. For example, using semantic segmentation, the electronic device 102 and/or the controller 104 may characterize the character object 112a and the character object 112b as 'character' objects at a top level of the ontology and may characterize the robot object 112c and the drone object 112d as 'equipment' objects at a top level of the ontology. Each object 112 may have more specific ontological characteristics associated with it at deeper levels of the hierarchy. For example, the robot object 112c and the drone object 112d may be characterized as a 'robot' and a 'drone,' respectively.

In some implementations, the electronic device 102 and/or the controller 104 generate an audio output 116 describing at least one of the objects 112. The audio output 116 may be based on a characteristic (e.g., a characteristic value) associated with the user 106. For example, the audio output 116 may include a voice characteristic (e.g., accent, pitch, etc.), an intonation characteristic, and/or a text description that may be varied based on the characteristic associated with the user 106. In some implementations, for example, the text description is generated based on the user's location, education level, age, language proficiency, etc.

In some implementations, the electronic device 102 and/or the controller 104 generate the audio output 116 based on a desired length of a listening experience. For example, if the user 106 indicates a preference for a short listening experience, the electronic device 102 and/or the controller 104 may generate a terse text description, e.g., with a low word count, for example, less than a threshold number of words. On the other hand, if the user 106 indicates a preference for a longer listening experience, the electronic device 102 and/or the controller 104 may generate a more verbose text description, e.g., with a high word count, for example, greater than a threshold number of words.

In some implementations, the electronic device 102 and/or the controller 104 generate the audio output 116 based on a velocity of the user 106. For example, if the user 106 is moving at a low velocity or is stationary, the electronic device 102 and/or the controller 104 may generate a text description with a high word count (e.g., greater than a threshold number of words). If the user 106 is moving at a high velocity, the electronic device 102 and/or the controller 104 may generate a text description with a low word count (e.g., less than a threshold number of words) or may increase the speed (e.g., words per minute) of the narration to keep pace with the movement of the user 106.

In some implementations, the electronic device 102 and/or the controller 104 generate the audio output 116 based on a position of the user 106. In some implementations, a global positioning system (GPS) location of the electronic device 102 and/or location information obtained from wireless signals may be used to identify the objects 112 and/or the environment 108. For example, semantic segmentation may be used to identify an object as a tower, while the GPS location of the electronic device 102 may be used to identify the tower as a specific tower (e.g., the Eiffel Tower).

In some implementations, the electronic device 102 and/or the controller 104 generate the audio output 116 when the electronic device 102 is in an accessibility mode. In some implementations, the electronic device 102 and/or the controller 104 generate the audio output 116 in response to determining that the user 106 is visually impaired. In some implementations, the electronic device 102 and/or the controller 104 generate the audio output 116 when the electronic device 102 is in a mode that limits display of information (e.g., in a driving mode).

In some implementations, a head-mountable device (HMD) being worn by the user 106 presents (e.g., displays) the environment 108. In some implementations, the HMD includes an integrated display (e.g., a built-in display) that displays the environment 108. In some implementations, the HMD includes a head-mountable enclosure. In various implementations, the head-mountable enclosure includes an attachment region to which another device with a display can be attached. For example, in some implementations, the electronic device 102 of FIG. 1 can be attached to the head-mountable enclosure. In various implementations, the head-mountable enclosure is shaped to form a receptacle for receiving another device that includes a display (e.g., the electronic device 102). For example, in some implementations, the electronic device 102 slides or snaps into or otherwise attaches to the head-mountable enclosure. In some implementations, the display of the device attached to the head-mountable enclosure presents (e.g., displays) the environment 108. In various implementations, examples of the electronic device 102 include smartphones, tablets, media players, laptops, etc.

Figure 2:
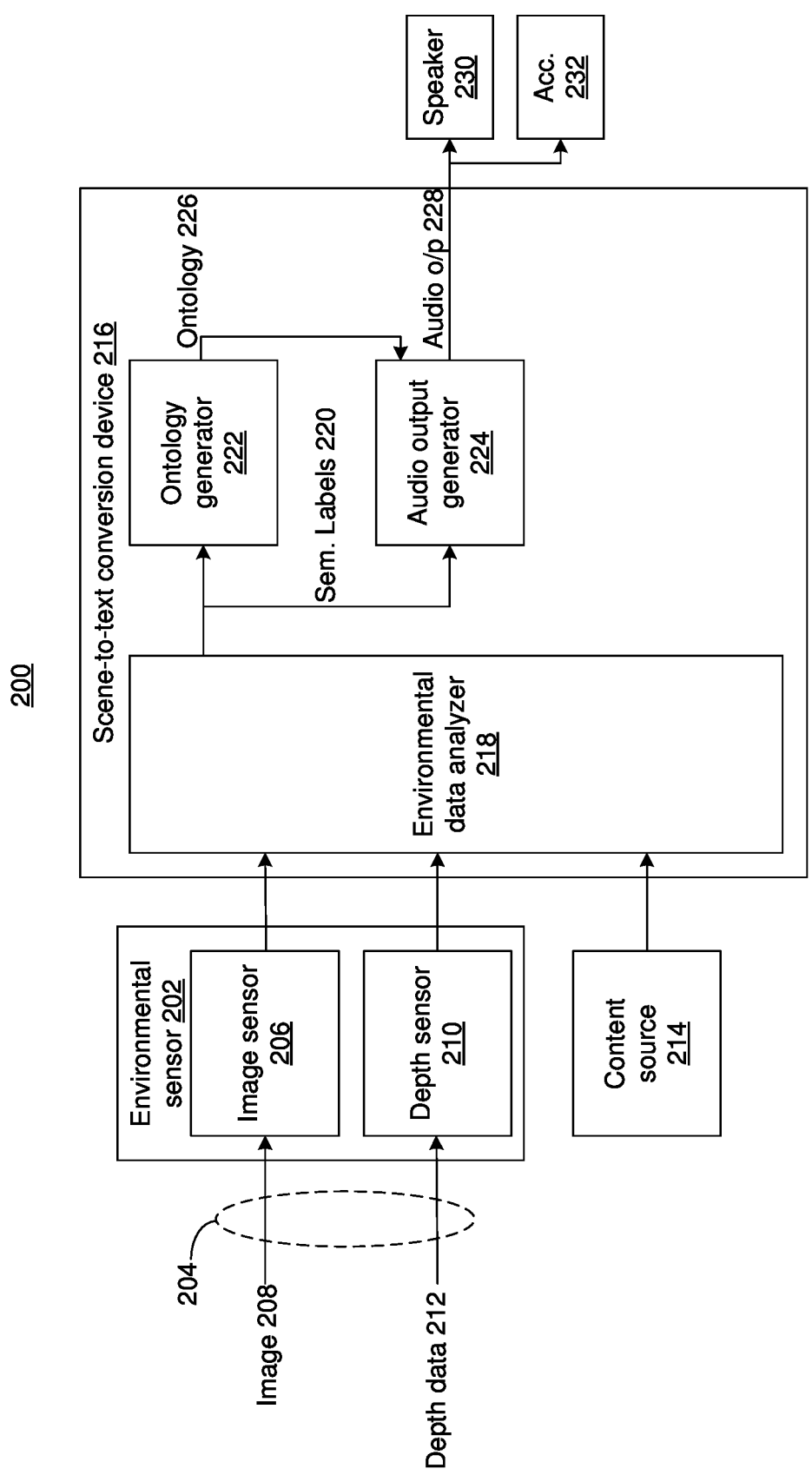
FIG. 2 illustrates an example system performing scene-to-text conversion according to various implementations.

FIG. 2 illustrates an example system 200 that performs scene-to-text conversion according to various implementations. In some implementations, an environmental sensor 202 obtains environmental data 204 corresponding to an environment, e.g., a physical environment. For example, in some implementations, the environmental sensor 202 comprises an image sensor 206, such as a camera, that obtains an image 208 of the environment. In some implementations, the environmental sensor 202 outputs image data that the environmental sensor 202 captures, e.g., the obtained image 208.

In some implementations, the image 208 is a still image. In some implementations, the image 208 is an image frame forming part of a video feed. The image 208 includes a plurality of pixels. Some of the pixels, e.g., a first set of pixels, represent an object. Other pixels, e.g., a second set of pixels, represent a background, e.g., portions of the image 208 that do not represent the object. It will be appreciated that pixels that represent one object may represent the background for a different object.

In some implementations, the environmental sensor 202 comprises a depth sensor 210 that obtains depth data 212 corresponding to the environment. The depth data 212 may be used independently of or in connection with the image 208 to identify one or more objects in the physical environment. In some implementations, the environmental sensor 202 outputs the obtained depth data 212 corresponding to the environment.

In some implementations, the environment is an XR environment generated by an XR content source 214. The XR content source 214 may provide the environmental data 204. For an XR environment, the environmental data 204 may include, for example, metadata and/or an image of the XR environment. The image may be a still image or may form a part of a video feed. The image includes a plurality of pixels. Some of the pixels, e.g., a first set of pixels, represent an object. Other pixels, e.g., a second set of pixels, represent a background, e.g., portions of the image that do not represent the object. It will be appreciated that pixels that represent one object may represent the background for a different object.

A scene-to-text conversion engine 216 receives the environmental data 204 from the environmental sensor 202 and/or the XR content source 214. In some implementations, an environmental data analyzer 218 receives the environmental data 204. In some implementations, the environmental data analyzer 218 identifies a plurality of objects that are in the environment based on the environmental data 204. For example, the environmental data analyzer 218 may perform semantic segmentation on the environmental data 204 to identify the objects in the environment. In some implementations, the environmental data 204 includes an image, and the environmental data analyzer 218 applies one or more filters and/or masks to the image to characterize pixels in the image as being associated with respective objects.

In some implementations, the environmental data analyzer 218 generates a plurality of semantic labels 220 describing the objects in the environment. In some implementations, the environmental data analyzer 218 providers the semantic labels 220 to an ontology generator 222 and/or an audio output generator 224.

In some implementations, the ontology generator 222 receives the semantic labels 220 from the environmental data analyzer 218 and generates an ontology 226 based on the semantic labels 220. In some implementations, the ontology 226 is implemented as one or more data structures representing (e.g., modeling) the objects in the environment as object entities. The ontology 226 may model relationships between the objects in the environment. For example, in some implementations, the ontology 226 is a hierarchical ontology. That is, in some implementations, the ontology 226 uses one or more hierarchical data structures to represent (e.g., model) the objects in the environment. In some implementations, for example, an object entity representing an object at one level in a hierarchy (e.g., a car or a crowd of people) may contain object entities that represent objects at a deeper level in the hierarchy (e.g., components of the car or individual members of the crowd of people).

In some implementations, the audio output generator 224 receives the semantic labels 220 and/or the ontology 226 and generates an audio output 228 describing at least one object (e.g., a first object) of the plurality of objects in the environment. The audio output generator 224 may generate the audio output 228 based on the semantic labels 220 and/or the ontology 226. For example, in some implementations, the semantic labels 220 comprise a plurality of descriptors associated with the objects in the environment, and the audio output generator 224 generates a text description based on the semantic labels 220. In some implementations, the audio output generator 224 uses the ontology 226 to supplement the information conveyed by the semantic labels 220.

In some implementations, the audio output generator 224 generates the text description based on one or more characteristic values associated with the user. For example, certain words used in the text description may be selected based on one or more of the user's location, educational level, language proficiency, age, and/or vision capability.

In some implementations, the audio output generator 224 generates the text description based on a desired narrative style, e.g., as specified by the user. For example, certain words used in the text description may be selected, e.g., from a language corpus, based on the desired narrative style.

In some implementations, the audio output generator 224 generates the audio output 228 based on a velocity of the user. The length of the text description may be determined based on the velocity of the user. For example, if the user is stationary or moving at a low velocity, the audio output generator 224 may generate a verbose text description with a high word count (e.g., greater than a threshold number of words). If the user is moving at a high velocity, the audio output generator 224 may generate a terse text description with a low word count (e.g., less than a threshold number of words). In some implementations, the audio output generator 224 selects a depth to which the ontology 226 is traversed (e.g., if the ontology 226 is hierarchical). For example, if the user is stationary or moving at a low velocity, the audio output generator 224 may traverse more levels of the ontology 226 (e.g., all levels). If the user is moving at a high velocity, the audio output generator 224 may traverse fewer levels of the ontology 226 (e.g., only the top level).

In some implementations, the audio output generator 224 performs text-to-speech conversion on the text description to generate the audio output 228. In some implementations, the audio output 228 has characteristics other than the text description itself. For example, the audio output 228 may have a voice characteristic. The voice characteristic may include, for example, the frequency and/or pitch of the voice, an accent associated with the voice, a mood associated with the voice, etc. In some implementations, the audio output 228 has an intonation characteristic. In some implementations, the audio output generator 224 determines (e.g., adjusts or selects) the voice characteristic and/or the intonation characteristic of the audio output 228 based on a characteristic value associated with the user. For example, the audio output generator 224 may determine the voice characteristic and/or the intonation characteristic of the audio output 228 based on the location, educational level, language proficiency, age, and/or vision capability of the user. In some implementations, the audio output generator 224 determines the voice characteristic and/or the intonation characteristic of the audio output 228 based on the desired narrative style of the audio output 228.

In some implementations, the audio output 228 is output via a speaker 230 that is integrated in the same electronic device as the system 200. In some implementations, the audio output 228 is provided to an accessory device 232 that is in communication with the electronic device in which the system 200 is incorporated. For example, the audio output 228 may be provided to a set of headphones or a speaker or speakers that are in wired or wireless communication with the electronic device in which the system 200 is incorporated.

Figure 3:
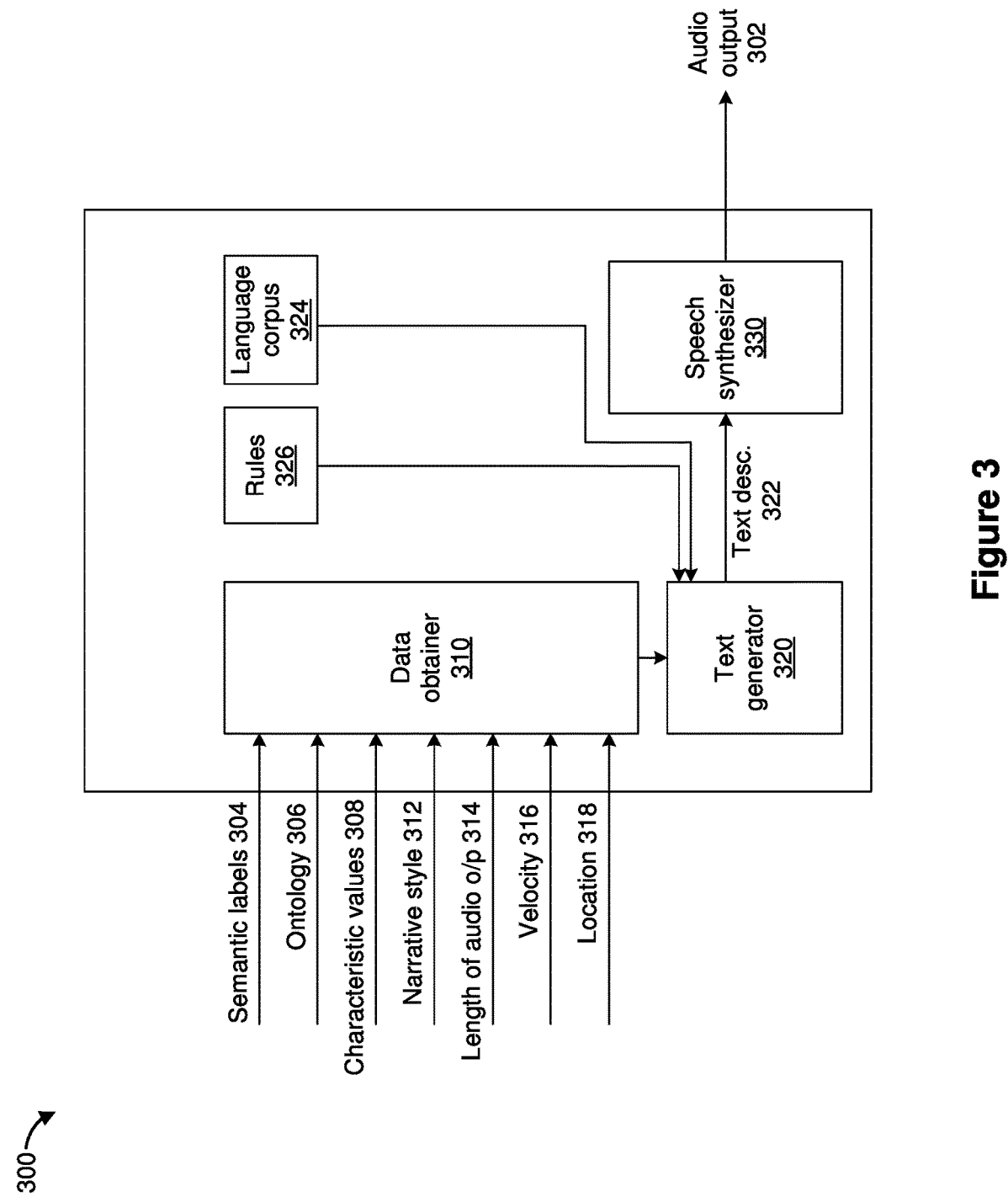
FIG. 3 is a block diagram of an example audio output generator in accordance with some implementations.

FIG. 3 is a block diagram of an example audio output generator 300 in accordance with some implementations. In some implementations, the audio output generator 300 implements the audio output generator 224 shown in FIG. 2.

In some implementations, the audio output generator 300 generates an audio output 302 that describes one or more objects in the environment in which a device implementing the audio output generator 300 is located. In some implementations, the audio output generator includes a data obtainer 310, a text generator 320, and a speech synthesizer 330. In various implementations, the data obtainer obtains semantic labels 304 and/or an ontology 306 that identify the one or more objects in the environment. In some implementations, the data obtainer 310 receives the semantic labels 304 from the environmental data analyzer 218 shown in FIG. 2. In some implementations, the data obtainer 310 receives the ontology 306 from the ontology generator 222 shown in FIG. 2.

In various implementations, the data obtainer 310 receives one or more characteristic values 308 that relate to a user of the device implementing the audio output generator 300. The one or more characteristic values 308 may include, for example, a location of the user (e.g., a current location and/or a location of origin of the user). In some implementations, the one or more characteristic values 308 include an education level of the user. In some implementations, the one or more characteristic values 308 include a language proficiency of the user (e.g., one or more languages in which the user is proficient and/or respective proficiency levels in each language). In some implementations, the one or more characteristic values 308 include an age of the user (e.g., a numerical age and/or an age category). In some implementations, the one or more characteristic values 308 indicate a vision capability of the user (e.g., unimpaired, vision-impaired, color-blind, blind).

In some implementations, the user 106 provides user input indicative of the one or more characteristic values 308. In some implementations, the data obtainer 310 obtains an input indicative of the one or more characteristic values from a social networking service. In some implementations, the data obtainer 310 obtains data indicative of the one or more characteristic values from a user profile.

In some implementations, the data obtainer 310 receives data indicative of a desired narrative style of the audio output 302. For example, the user may provide user input indicative of whether the user wishes to receive a nonfictional or fictional listening experience, or whether the user wishes to listen to a narrative in the style of science fiction, horror, children's literature, etc. In some implementations, the user may provide user input indicative of a desired mood of the audio output 302.

In some implementations, the data obtainer 310 receives data indicative of the desired narrative style from the environment. For example, the data obtainer 310 may analyze the environment to estimate or predict the desired narrative style. In some implementations, the data obtainer 310 performs semantic segmentation on the environment to identify one or more objects in the environment. The data obtainer 310 may predict the desired narrative style based on the identified object or objects.

In some implementations, the data obtainer 310 receives data indicative of a desired length 314 of the audio output 302. For example, the user may provide user input that indicates that the user wishes to listen to a quick narrative. On the other hand, the user may provide user input that indicates that the user would prefer a lengthier audio experience.

In some implementations, the data obtainer 310 receives data indicative of a velocity 316 of the user. As disclosed herein, the velocity 316 may be used to pace the audio output 302 by determining the length and/or narration speed of the audio output 302 based on the velocity 316.

In some implementations, the data obtainer 310 receives data indicative of a location 318 of the user. For example, the user may provide user input indicative of the user's current location. In some implementations, the electronic device implementing the audio output generator 300 determines the location 318, for example, using a GPS location or a wireless signal. As disclosed herein, the location 318 may be used to pace the audio output 302 by synchronizing the audio output 302 with known waypoints in a physical environment. In some implementations, the location 318 is used to identify an object in the physical environment (e.g., identifying a Ferris wheel as the High Roller based on the location 318 being indicated as Las Vegas, Nevada, or as the Singapore Flyer based on the location 318 being indicated as Singapore).

In some implementations, the text generator 320 generates a text description 322 describing the one or more objects in the environment based on the data received by the data obtainer 310. For example, the text generator 320 may generate the text description 322 based on the semantic labels 304 identifying the objects in the environment. In some implementations, the text generator 320 generates the text description 322 based on the ontology 306. For example, the ontology 306 may include information indicative of the objects in the environment. In some implementations, the ontology 306 includes information describing the objects in the environment, such as attributes (e.g., color, material, etc.) of the objects. In some implementations, the ontology 306 includes information indicative of relationships between objects in the environment. Information relating to objects in the environment may be stored at different levels of the ontology 306. In some implementations, the text generator 320 selects one or more levels of the ontology 306 to traverse in generating the text description 322, for example, based on a desired level of detail or verbosity of the text description 322.

In some implementations, the text generator 320 generates the text description 322 based on the one or more characteristic values 308 that relate to the user of the device implementing the audio output generator 300. For example, the text generator 320 may generate the text description 322 based on the location of the user (e.g., a current location and/or a location of origin of the user). In some implementations, the text generator 320 selects phrases (e.g., words) that are likely to be familiar to the user based on a location associated with the user. For example, if an object in the environment is associated with the semantic label 'truck' and the user is based in the United Kingdom, the text generator 320 may use the phrase 'lorry' to describe the object associated with the semantic label 'truck.' In some implementations, the text generator 320 uses a language corpus 324 to obtain supplemental or replacement phrases to insert in the text description 322. The language corpus 324 may be stored in a memory and may include phrases and corresponding metadata. In some implementations, the metadata associates the phrases with characteristics such as formality level (e.g., formal vs. casual), geographic area (e.g., United Kingdom, Southern United States, Midwestern United States), related phrases (e.g., 'flat' is synonymous with and can replace 'apartment'), etc.

In some implementations, the text generator 320 generates the text description 322 based on an education level of the user. For example, the text generator 320 may select phrases to insert in the text description 322 based on a reading level of the user. In some implementations, the language corpus 324 provides supplemental or replacement phrases to insert in the text description 322. In some implementations, the text generator 320 determines an organization of the text description 322, e.g., sentence structures and/or paragraph structures, based on the education level of the user. For example, for a user with a high school diploma, the text generator 320 may generate a text description with simple sentence and paragraph structures. The text generator 320 may generate a text description with complex sentence and paragraph structures for a user with a college degree in English literature. The text generator 320 may obtain rules 326 governing the text description 322 and may generate the text description 322 in accordance with the rules 326.

In some implementations, the text generator 320 generates the text description 322 based on a language proficiency of the user (e.g., one or more languages in which the user is proficient and/or respective proficiency levels in each language). For example, the text generator 320 may select phrases to insert in the text description 322 based on a language understood by the user. In some implementations, the text generator 320 selects phrases to insert in the text description 322 based on a level of proficiency in a language understood by the user. In some implementations, e.g., if the user is proficient in multiple languages, the data obtainer 310 receives a user input indicating a selection of a preferred language in which the user wishes to experience the audio output 302, and the text generator 320 generates the text description 322 in the selected language. In some implementations, the language corpus 324 provides replacement or supplemental phrases to insert in the text description 322. The language corpus 324 may be stored in a memory and may include phrases and corresponding metadata. In some implementations, the metadata associates the phrases with characteristics such as a language, related phrases (e.g., 'house' in English can replace or be replaced by 'maison' in French or 'casa' in Spanish), grammatical gender (e.g., masculine, feminine, neuter), etc. In some implementations, the text generator 320 obtains rules 326, e.g., grammatical rules, and generates the text description 322 in accordance with the rules 326.

In some implementations, the text generator 320 generates the text description 322 based on an age of the user (e.g., a numerical age and/or an age category). For example, the text generator 320 may select phrases to insert in the text description 322 based on an age category of the user. In some implementations, the language corpus 324 provides replacement or supplemental phrases to insert in the text description 322. The language corpus 324 may include phrases and corresponding metadata. In some implementations, the metadata associates phrases with related phrases (e.g., 'dog' can replace or be replaced by 'doggy' for a younger user). In some implementations, the rules 326 specify phrases that are to be omitted from the audio output 302 based on the user's age. For example, a rule 326 may specify that if the characteristic values 308 indicate that the user is below a threshold age, certain phrases (e.g., profanity or other potentially offensive phrases) be omitted from the text description 322.

In some implementations, the text generator 320 generates the text description 322 based on a vision capability of the user (e.g., unimpaired, vision-impaired, color-blind, or blind). For example, the text generator 320 may select phrases to insert in the text description 322 based on the vision capability of the user. In some implementations, the rules 326 specify phrases that are to be omitted from the audio output 302 based on the user's vision capability. For example, a rule 326 may specify that if the characteristic values 308 indicate that the user is blind and may not have an understanding of visual concepts, phrases indicative of such visual concepts may be omitted from the text description 322.

In some implementations, the text generator 320 generates the text description 322 based on the narrative style 312. For example, the text generator 320 may select phrases to insert in the text description 322 based on the narrative style 312. In some implementations, the text generator 320 selects phrases (e.g., words) that are associated with the narrative style. For example, if an object in the environment is associated with the semantic label 'animal,' the text generator 320 may use the phrase 'animal' to describe the object in a nonfiction narrative style. For a science fiction narrative style, the text generator 320 may use the phrase 'lifeform' to describe the same object. For a horror fiction narrative style, the text generator 320 may use the phrase 'creature' or 'monster' to describe the same object. In some implementations, the text generator 320 uses a language corpus 324 to obtain supplemental or replacement phrases to insert in the text description 322. The language corpus 324 may be stored in a memory and may include phrases and corresponding metadata. In some implementations, the metadata associates the phrases with characteristics such as associated narrative styles and related phrases (e.g., 'animal' is synonymous with and can replace or be replaced by lifeform,' 'creature,' or 'monster'), etc.

In some implementations, the text generator 320 generates the text description 322 based on a velocity of the user. The length of the text description may be determined based on the velocity of the user. For example, if the user is stationary or moving at a low velocity (e.g., at less than a threshold velocity), the text generator 320 may generate a text description 322 with a high word count (e.g., greater than a threshold number of words). If the user is moving at a high velocity (e.g., at greater than a threshold velocity), the text generator 320 may generate a text description 322 with a low word count (e.g., less than a threshold number of words). In some implementations, the text generator 320 selects a depth to which the ontology 306 is traversed (e.g., if the ontology 306 is hierarchical). For example, if the user is stationary or moving at a low velocity, the text generator 320 may traverse more levels of the ontology 306 (e.g., all levels). If the user is moving at a high velocity, the text generator 320 may traverse fewer levels of the ontology 306 (e.g., only the top level).

In some implementations, the speech synthesizer 330 performs text-to-speech conversion on the text description 322 to generate the audio output 302. In some implementations, the audio output 302 has characteristics other than the text description itself. For example, the audio output 302 may have a voice characteristic. The voice characteristic may include, for example, the frequency and/or pitch of the voice, an accent associated with the voice, a mood associated with the voice, etc. In some implementations, the audio output 302 has an intonation characteristic. In some implementations, the speech synthesizer 330 determines (e.g., adjusts or selects) the voice characteristic and/or the intonation characteristic of the audio output 302 based on a characteristic value associated with the user. For example, the speech synthesizer 330 may determine the voice characteristic and/or the intonation characteristic of the audio output 302 based on the location, educational level, language proficiency, age, and/or vision capability of the user. In some implementations, the speech synthesizer 330 determines the voice characteristic and/or the intonation characteristic of the audio output 302 based on the desired narrative style of the audio output 302.

In some implementations, the audio output 302 is output via a speaker integrated in the electronic device implementing the audio output generator 300. In some implementations, the audio output 302 is provided to an accessory device that is in communication with the electronic device implementing the audio output generator. For example, the audio output 302 may be provided to a set of headphones or a speaker or speakers via a wired or wireless communication link.

FIGS. 4A-4D are a flowchart representation of a method 400 for performing scene-to-text conversion in accordance with some implementations. In various implementations, the method 400 is performed by a device (e.g., the system 200 shown in FIG. 2). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes obtaining environmental data corresponding to an environment, identifying objects in the environment based on the environmental data, generating an audio output describing one or more objects in the environment based on a characteristic value associated with a user of the device, and outputting the audio output.

Figure 4A:
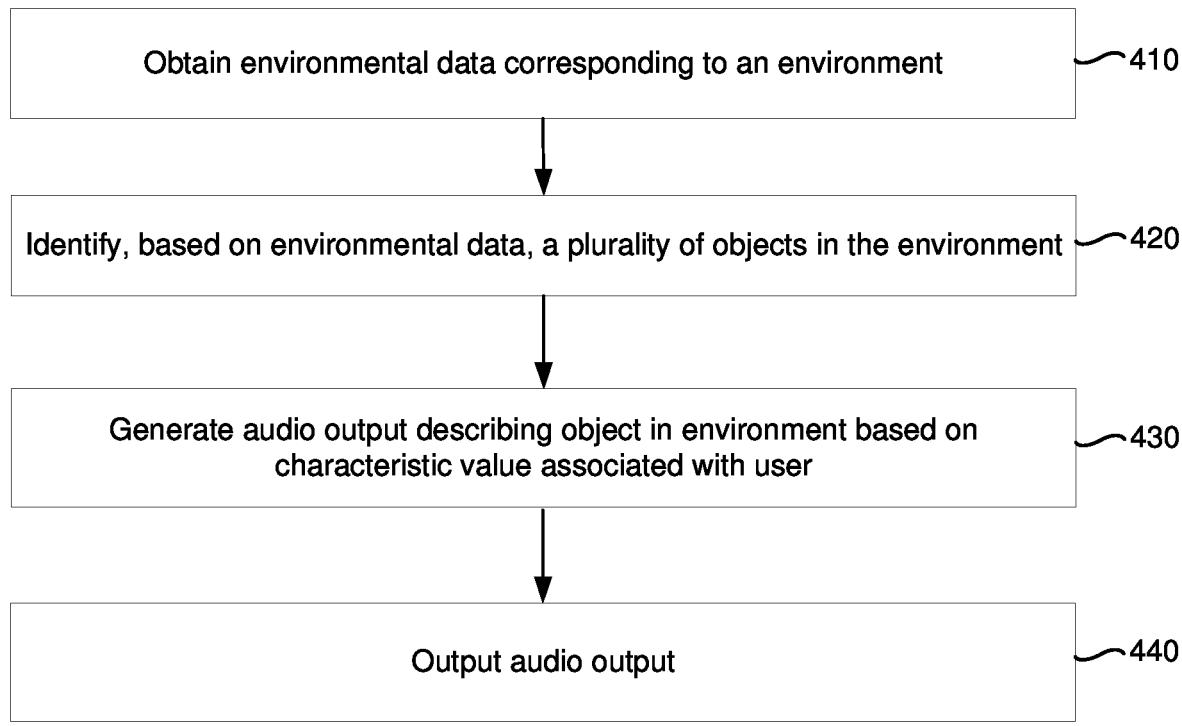
FIGS. 4A-4D are a flowchart representation of a method for performing scene-to-text conversion in accordance with some implementations.
Figure 4B:
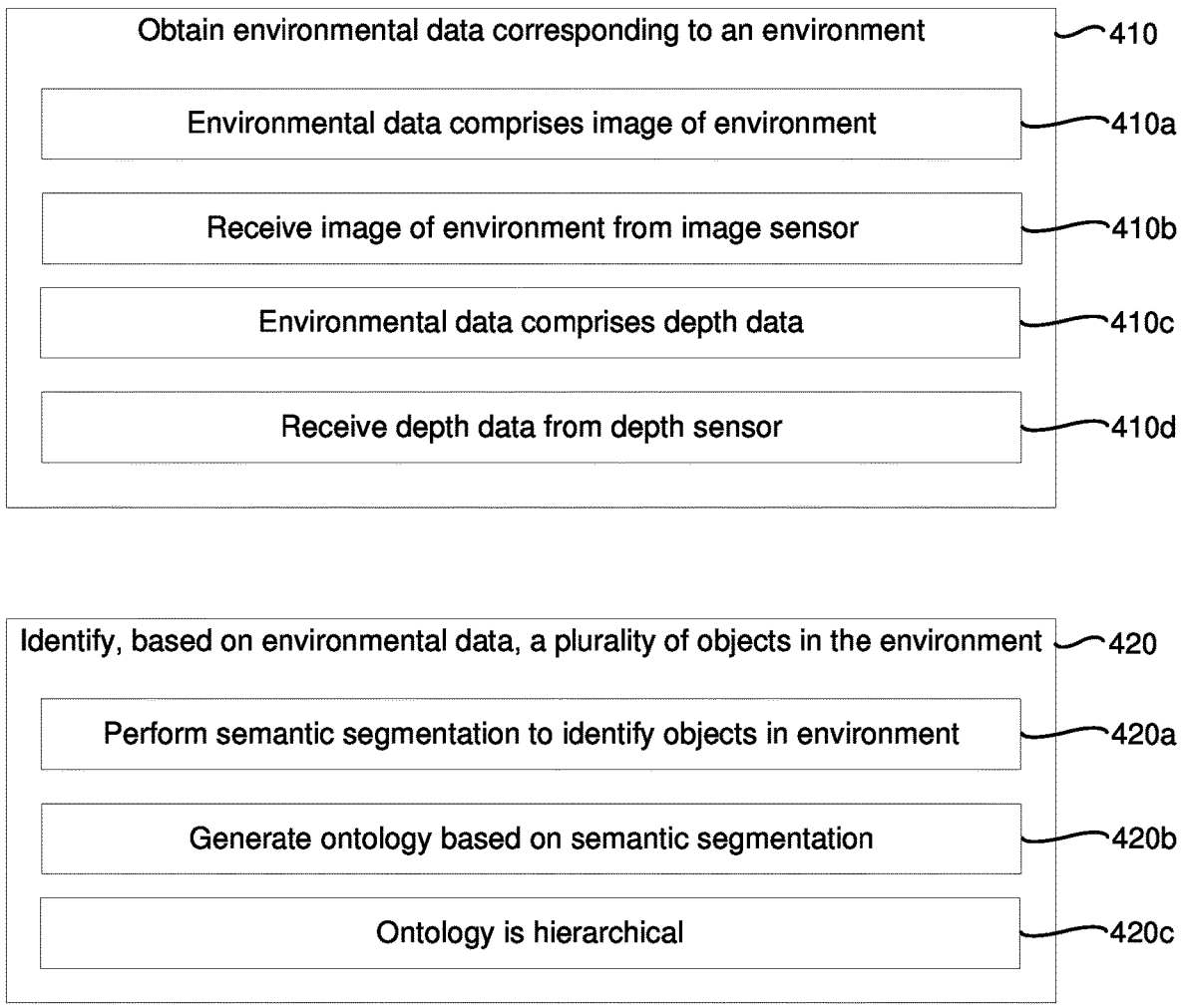

Referring to FIG. 4A, as represented by block 410, the method 400 may include obtaining environmental data corresponding to an environment. In some implementations, the environment is a physical environment. Referring now to FIG. 4B, as represented by block 410*a*, the environmental data may include an image of the environment. In some implementations, the image is a still frame. In some implementations, the image is an image frame forming part of a video feed. The image of the environment may be received from an image sensor (e.g., a camera), as represented by block 410*b*. In some implementations, the environment is an XR environment, and the image of the environment is received from an XR content source. As represented by block 410*c*, in some implementations, the environmental data includes depth data. The depth data may be received from a depth sensor, as represented by block 410*d*.

As represented by block 420, in some implementations, the method 400 includes identifying a plurality of objects in the environment based on the environmental data. As represented by block 420*a*, in some implementations, semantic segmentation may be performed to identify the objects in the environment. For example, in some implementations, the environmental data includes an image, and one or more filters and/or masks are applied to the image to characterize pixels in the image as being associated with respective objects. Semantic segmentation is then performed to generate semantic labels corresponding to the objects represented by the pixels.

In some implementations, as represented by block 420*b*, an ontology is generated based on the semantic segmentation. For example, in some implementations, one or more data structures may be generated to represent (e.g., model) the objects in the environment as object entities. The ontology may model relationships between the objects in the environment. In some implementations, as represented by block 420*c*, the ontology is hierarchical. For example, one or more data structures may be implemented as a hierarchical data structure, such as a node graph. In some implementations, for example, a top-level node represents an object at one level in a hierarchy (e.g., a car or a crowd of people). Child nodes in the node graph may represent objects at a deeper level in the hierarchy (e.g., components of the car or individual members of the crowd of people). In some implementations, child nodes represent attributes or characteristics of the objects represented by their respective parent nodes.

Figure 4C:
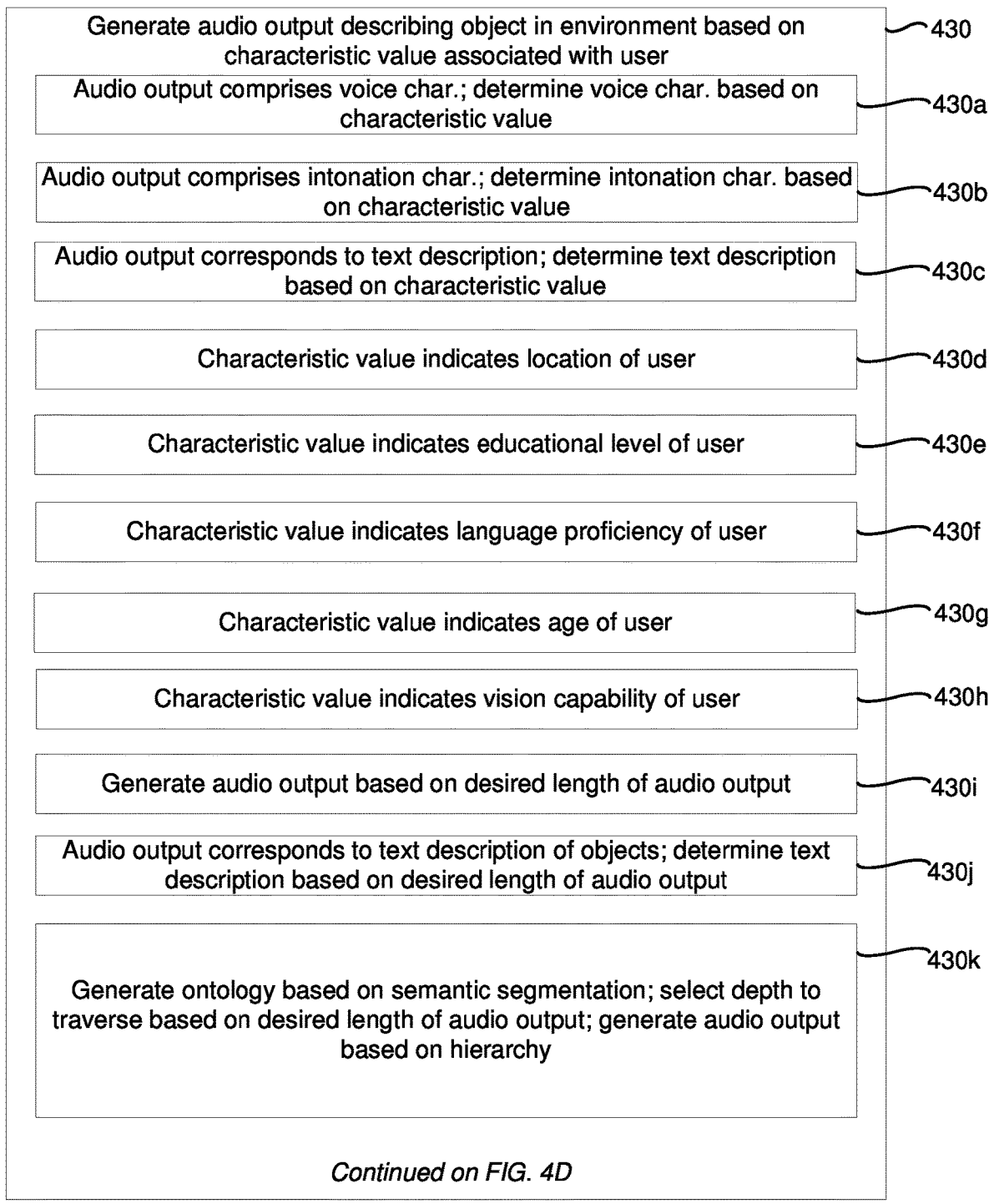

As represented by block 430, in some implementations, the method 400 includes generating an audio output based on a characteristic value associated with a user of the device. The audio output describes at least a first object of the plurality of objects in the environment. Referring now to FIG. 4C, in some implementations, the audio output comprises a voice characteristic that is determined based on the characteristic value, as represented by block 430*a*. The voice characteristic may include, for example, the frequency and/or pitch of the voice, an accent associated with the voice, a mood associated with the voice, etc. In some implementations, as represented by block 430*b*, the audio output comprises an intonation characteristic that is determined based on the characteristic value. For example, the voice characteristic and/or the intonation characteristic of the audio output may be determined based on the location, educational level, language proficiency, age, and/or vision capability of the user. In some implementations, for example, the audio output may have more frequency variations when the user is a young child than when the user is an adult.

In some implementations, as represented by block 430*c*, the audio output corresponds to a text description of the plurality of objects, and the method 400 includes determining the text description based on the characteristic value. For example, phrases may be selected for inclusion in the text description from a language corpus stored in a memory. In some implementations, the language corpus includes phrases and corresponding metadata. In some implementations, the metadata associates the phrases with characteristics such as formality level (e.g., formal vs. casual), geographic area (e.g., United Kingdom, Southern United States, Midwestern United States), related phrases (e.g., "flat" is synonymous with and can replace "apartment"), grammatical gender, etc. In some implementations, the selection of phrases for inclusion in the text description is guided by rules that may specify, for example, sentence and paragraph structures, phrases to avoid using, and/or other constraints on the text description.

In some implementations, as represented by block 430*d*, the characteristic value indicates a location of the user. For example, the text description may be generated based on the location of the user (e.g., a current location and/or a location of origin of the user). In some implementations, the text generator 320 selects phrases (e.g., words) that are likely to be familiar to the user based on a location associated with the user. For example, if an object in the environment is associated with the semantic label "truck" and the user is based in the United Kingdom, the text generator 320 may use the phrase "lorry" to describe the object associated with the semantic label "truck." In some implementations, the current location of the user is used to identify an object in the physical environment as a particular object (e.g., identifying a Ferris wheel as the High Roller based on the location being indicated as Las Vegas, Nev., or as the Singapore Flyer based on the location being indicated as Singapore).

In some implementations, as represented by block 430*e*, the characteristic value indicates an educational level of the user. For example, the text generator 320 may select phrases to insert in the text description based on a reading level of the user. In some implementations, the language corpus provides supplemental or replacement phrases to insert in the text description. In some implementations, the text generator 320 determines an organization of the text description, e.g., sentence structures and/or paragraph structures, based on the education level of the user. For example, for a user with a high school diploma, the text generator 320 may generate a text description with simple sentence and paragraph structures. The text generator 320 may generate a text description with complex sentence and paragraph structures for a user with a college degree in English literature.

In some implementations, as represented by block 430*f*, the characteristic value indicates a language proficiency of the user. For example, the text description may be generated based on a user input indicating one or more languages in which the user is proficient and/or respective proficiency levels in each language. For example, the text generator 320 may select phrases to insert in the text description based on a language understood by the user. In some implementations, the text generator 320 selects phrases to insert in the text description based on a level of proficiency in a language understood by the user. In some implementations, e.g., if the user is proficient in multiple languages, the user input indicates a selection of a language in which the user wishes to experience the audio output, and the text generator 320 generates the text description in the selected language. In some implementations, the language corpus provides replacement or supplemental phrases to insert in the text description. The language corpus may include phrases and corresponding metadata that associates the phrases with characteristics such as a language, related phrases (e.g., "car" in English can replace or be replaced by "voiture" in French or "macchina" in Italian), grammatical gender (e.g., masculine, feminine, neuter), etc. The text generator 320 may generate the text description in accordance with language-specific rules, e.g., relating to syntax.

In some implementations, as represented by block 430*g*, the characteristic value indicates an age of the user (e.g., a numerical age and/or an age category). For example, the text generator 320 may select phrases to insert in the text description based on an age category of the user. In some implementations, the language corpus provides replacement or supplemental phrases to insert in the text description. The language corpus may include phrases and corresponding metadata. In some implementations, the metadata associates phrases with related phrases (e.g., "cat" can replace or be replaced by "kitty" for a younger user). In some implementations, rules specify phrases that are to be omitted from the audio output based on the user's age. For example, a rule may specify that if the characteristic value indicates that the user is a young child, certain phrases (e.g., profanity or other potentially offensive phrases) be omitted from the text description.

In some implementations, as represented by block 430*h*, the characteristic value indicates a vision capability of the user. The text generator 320 may generate the text description based on the vision capability of the user. For example, the text generator 320 may select phrases to insert in the text description based on the vision capability of the user. In some implementations, the rules specify phrases that are to be omitted from the audio output based on the user's vision capability.

In some implementations, as represented by block 430*i*, the method includes generating the audio output based on a desired length of the audio output. As represented by block 430*j*, in some implementations, the audio output corresponds to a text description that is determined based on the desired length of the audio output. For example, if the user indicates a preference for a short listening experience, the text generator 320 may generate the text description with a low word count. On the other hand, if the user indicates a preference for a longer listening experience, the text generator 320 may generate a more verbose text description, e.g., with a high word count. In some implementations, as represented by block 430*k*, an ontology is generated based on the semantic segmentation, and the text generator 320 selects a depth of the ontology to traverse in generating the text description based on the desired length of the audio output. The audio output is generated based on the hierarchy, e.g., the traversed portion of the hierarchy.

Figure 4D:
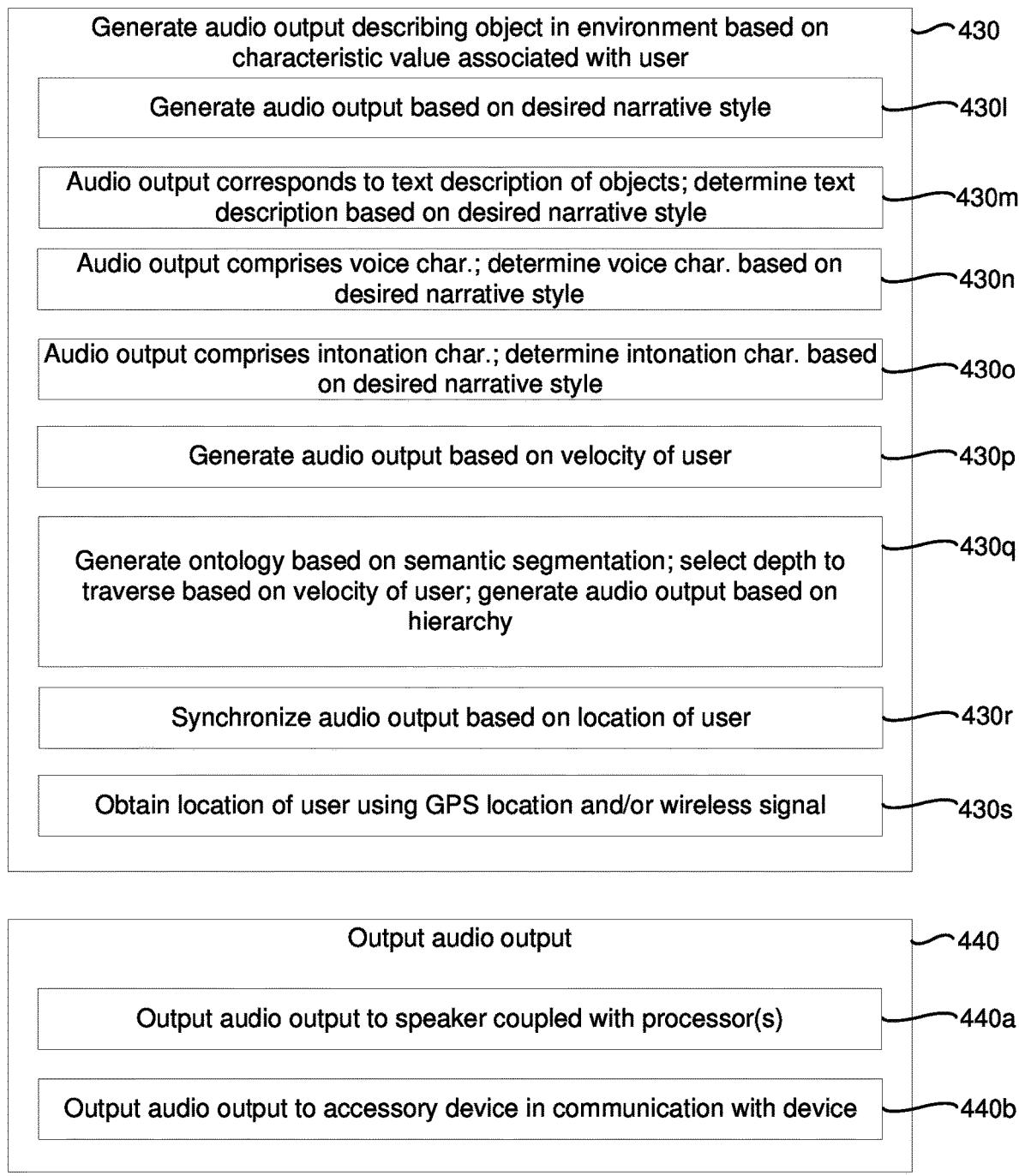

Referring to FIG. 4D, in some implementations, as represented by block 430*l*, the audio output is generated based on a desired narrative style of the audio output. For example, as represented by block 430*m*, the audio output corresponds to a text description of the plurality of objects, and the text description is determined based on the desired narrative style. In some implementations, the user may provide user input indicative of whether the user wishes to receive a nonfictional or fictional listening experience, or whether the user wishes to listen to a narrative in the style of science fiction, horror, children's literature, etc. In some implementations, the text generator 320 generates the text description based on the selected narrative style. For example, the text generator 320 may select phrases to insert in the text description based on the narrative style. In some implementations, the text generator 320 selects phrases (e.g., words) that are associated with the narrative style. For example, if an object in the environment is associated with the semantic label "person," the text generator 320 may use the phrase "person" to describe the object in a nonfiction narrative style. For a science fiction narrative style, the text generator 320 may use the phrase "Earthling" to describe the same object. In some implementations, the text generator 320 uses a language corpus to obtain supplemental or replacement phrases to insert in the text description. The language corpus may include phrases and corresponding metadata that associates the phrases with characteristics such as associated narrative styles and related phrases (e.g., "person" is synonymous with and can replace or be replaced by "human," "Earthling"), etc.

In some implementations, as represented by block 430*n*, the audio output comprises a voice characteristic that is determined based on the desired narrative style. For example, if the user selects a science fiction narrative style, the audio output may be characterized by a robotic voice. In some implementations, as represented by block 430*o*, the audio output comprises an intonation characteristic that is determined based on the desired narrative style. For example, if the user selects a nonfiction narrative style, the audio output may be characterized by a monotonous voice.

In some implementations, as represented by block 430*p*, the audio output is generated based on a velocity of the user. For example, the length of the text description may be determined based on the velocity of the user. In some implementations, if the user is stationary or moving at a low velocity, the text generator 320 generates a verbose text description with a high word count. If the user is moving at a high velocity, the text generator 320 generates a terse text description with a low word count.

In some implementations, as represented by block 430*q*, an ontology is generated based on the semantic segmentation, and the text generator 320 selects a depth of the ontology to traverse in generating the text description based on the velocity of the user. For example, if the user is stationary or moving at a low velocity, the text generator 320 may traverse more levels of the ontology (e.g., all levels). If the user is moving at a high velocity, the text generator 320 may traverse fewer levels of the ontology (e.g., only the top level). The audio output is generated based on the hierarchy, e.g., the traversed portion of the hierarchy.

In some implementations, as represented by block 430*r*, the method 400 includes synchronizing the audio output based on the location of the user. For example, in some implementations, as represented by block 430*s*, the location of the user is determined using a GPS location or a wireless signal. The location may be used to pace the audio output by synchronizing the audio output with known waypoints in a physical environment.

In some implementations, as represented by block 440, the method 400 includes outputting the audio output. In some implementations, as represented by block 440*a*, the audio output is output via a speaker that is integrated in the device that performs the scene-to-text conversion. In some implementations, as represented by block 440*b*, the audio output is provided to an accessory device that is in communication with the device that performs the scene-to-text conversion. For example, the audio output may be provided to a set of headphones or a speaker or speakers that are in wired or wireless communication with the device that performs the scene-to-text conversion.

In some implementations, the method 400 includes generating an ontology for the environment based on a semantic segmentation of the environmental data. In some implementations, the ontology indicates a hierarchy of the plurality of objects. In some implementations, the method 400 includes ordering respective descriptions of the plurality of objects in the audio output based on the hierarchy indicated by the ontology. As such, in various implementations, the device outputs an audio description of an object that is towards a top of the hierarchy before outputting an audio description of an object that is towards a bottom of the hierarchy. Since objects towards the top of the hierarchy may be more relevant than objects towards the bottom of the hierarchy, the user hears audio descriptions of objects that may be more relevant before hearing audio descriptions of objects that may be less relevant.

Figure 5:
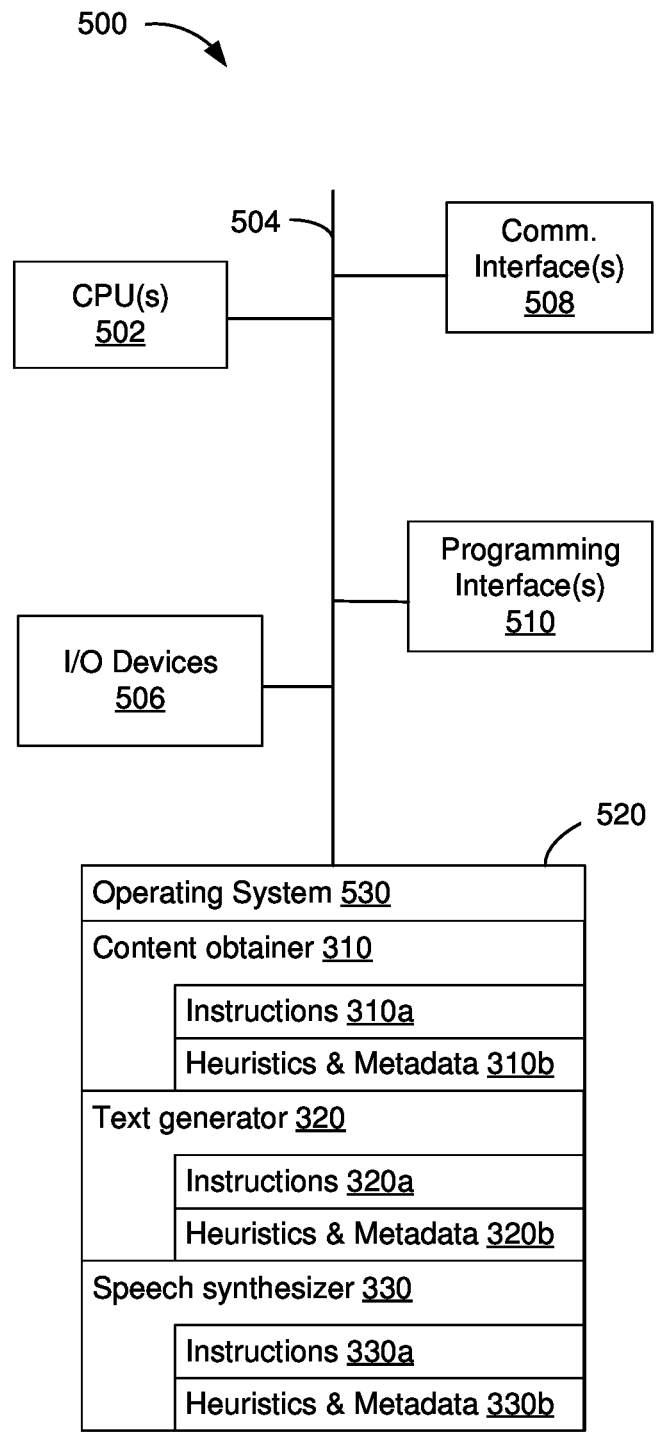
FIG. 5 is a block diagram of a device performing scene-to-text conversion in accordance with some implementations.

FIG. 5 is a block diagram of a device 500 that performs scene-to-text conversion in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 500 includes one or more processing units 502 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 506, one or more communication interfaces 508 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 510, a memory 520, and one or more communication buses 504 for interconnecting these and various other components.

In some implementations, the one or more communication buses 504 include circuitry that interconnects and controls communications between system components. In some implementations, the one or more I/O devices 506 include at least one of a keyboard, a mouse, a touchpad, a joystick, one or more microphones, one or more speakers, one or more image sensors (e.g., one or more cameras, for example, a front-facing camera), one or more displays (e.g., one or more XR displays), and/or the like.

The memory 520 may include high-speed random-access memory, such as dynamic random-access memory (DRAM), static random-access memory (ERAM), double-data-rate random-access memory (DDR RAM), or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530, the data obtainer 310, the text generator 320, and the speech synthesizer 330.

The operating system 530 includes procedures for handling various basic system services and for performing hardware dependent tasks.

As described herein, in various implementations, the data obtainer 310 obtains (e.g., receives or retrieves) data, including, for example, semantic labels, an ontology, characteristic values associated with a user, a desired narrative style, a desired length of an audio output, a velocity of the user, and/or a location of the user. To that end, the data obtainer 310 includes instructions 310*a* and heuristics and metadata 310*b*. As described herein, in various implementations, the text generator 320 generates a text description of the objects in the environment, e.g., based on the data obtained by the data obtainer 310. To that end, the text generator 320 includes instructions 320*a* and heuristics and metadata 320*b*. As described herein, in various implementations, the speech synthesizer 330 generates an audio output based on the text description. To that end, the speech synthesizer 330 includes instructions 330*a* and instructions and heuristics 330*b*.

Although the data obtainer 310, the text generator 320, and the speech synthesizer 330 are shown as residing on a single device, it should be understood that in other implementations, any combination of the data obtainer 310, the text generator 320, and the speech synthesizer 330 may be located in separate computing devices.

Moreover, FIG. 5 is intended more as functional description of the various features which be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

Various techniques discussed herein consider the use of location information to affect visual characteristics. Implementers of such technologies are reminded to inform and obtain a user's permission for using such information. Location information should be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental and industry standards.

It is possible to implement the techniques described herein under an opt-in model, such that a user's informed consent is obtained before their location is used to provide the features contemplated. Settings or other preferences may be adjusted such that users can decide whether to enable the techniques described herein. It is also possible to limit the degree to which location information is obtained and/or used. For instance, locations can be obscured such that, for example, the location information identifies the country but does not identify a precise location of the user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
at a device including a non-transitory memory and one or more processors coupled with the non-transitory memory:
obtaining environmental data corresponding to an environment;
identifying, based on the environmental data, a plurality of objects that are in the environment;
generating, based on a characteristic value associated with a user of the device, an audio output describing at least a first object of the plurality of objects in the environment, wherein the audio output represents a first set of words when the characteristic value is less than a threshold and the audio output represents a second set of words that is different from the first set of words when the characteristic value is greater than the threshold; and
outputting the audio output.

2. The method of claim 1, wherein the environmental data comprises an image of the environment.

3. The method of claim 2, further comprising obtaining the image of the environment using an image sensor of the device.

4. The method of claim 1, wherein the environmental data comprises depth data.

5. The method of claim 4, further comprising obtaining the depth data using a depth sensor of the device.

6. The method of claim 1, further comprising:
performing semantic segmentation on the environmental data; and
identifying the plurality of objects based on the semantic segmentation.

7. The method of claim 6, further comprising generating an ontology based on the semantic segmentation.

8. The method of claim 7, wherein the ontology is hierarchical.

9. The method of claim 1, wherein the audio output is associated with a voice characteristic, the method further comprising determining the voice characteristic based on the characteristic value.

10. The method of claim 1, wherein the audio output is associated with an intonation characteristic, the method further comprising determining the intonation characteristic based on the characteristic value.

11. The method of claim 1, wherein the characteristic value indicates a geographical region of the user.

12. The method of claim 1, wherein the characteristic value indicates an educational level of the user.

13. The method of claim 1, wherein the characteristic value indicates a language preference of the user.

14. The method of claim 1, wherein the characteristic value indicates an age of the user.

15. The method of claim 1, wherein the characteristic value indicates a vision capability of the user.

16. A device comprising:
one or more processors;
a non-transitory memory; and
one or more programs stored in the non-transitory memory, which, when executed by the one or more processors, cause the device to:
obtain environmental data corresponding to an environment;
identify, based on the environmental data, a plurality of objects that are in the environment;
generate, based on a characteristic value associated with a user of the device, an audio output describing at least a first object of the plurality of objects in the environment, wherein the audio output represents a first set of words when the characteristic value is less than a threshold and the audio output represents a second set of words that is different from the first set of words when the characteristic value is greater than the threshold; and
output the audio output.

17. A non-transitory memory storing one or more programs, which, when executed by one or more processors of a device, cause the device to:
obtain environmental data corresponding to an environment;
identify, based on the environmental data, a plurality of objects that are in the environment;
generate, based on a characteristic value associated with a user of the device, an audio output describing at least a first object of the plurality of objects in the environment, wherein the audio output represents a first set of words when the characteristic value is less than a threshold and the audio output represents a second set of words that is different from the first set of words when the characteristic value is greater than the threshold; and
output the audio output.

18. The method of claim 1, wherein the characteristic value indicates a desired level of verbosity and the threshold includes a verbosity threshold; and
wherein the first set of words is smaller than the second set of words when the desired level of verbosity is less than the verbosity threshold.

19. The method of claim 1, wherein the characteristic value includes a velocity of the user and the threshold includes a velocity threshold; and
   wherein the first set of words is greater than the second set of words when the velocity is less than the velocity threshold.

20. The device of claim 16, wherein the characteristic value includes a velocity of the user and the threshold includes a velocity threshold; and
   wherein the first set of words is greater than the second set of words when the velocity is less than the velocity threshold.

21. The device of claim 16, wherein the audio output is associated with a voice characteristic, and the device determines the voice characteristic based on the characteristic value.

22. The device of claim 16, wherein the characteristic value indicates a desired level of verbosity and the threshold includes a verbosity threshold; and
   wherein the first set of words is smaller than the second set of words when the desired level of verbosity is less than the verbosity threshold.

23. The non-transitory memory of claim 17, wherein the audio output is associated with an intonation characteristic, and the device determines the intonation characteristic based on the characteristic value.

24. The non-transitory memory of claim 17, wherein the characteristic value indicates a desired level of verbosity and the threshold includes a verbosity threshold; and
   wherein the first set of words is smaller than the second set of words when the desired level of verbosity is less than the verbosity threshold.

25. The non-transitory memory of claim 17, wherein the characteristic value includes a velocity of the user and the threshold includes a velocity threshold; and
   wherein the first set of words is greater than the second set of words when the velocity is less than the velocity threshold.

* * * * *